Jan. 21, 1958 R. H. JOHNSON 2,820,882
PROCESS FOR WELDING METALLIC SANDWICH STRUCTURE
Filed Nov. 15, 1955 2 Sheets-Sheet 1

INVENTOR.
RAYMOND H. JOHNSON
BY
Knox & Knox

Jan. 21, 1958  R. H. JOHNSON  2,820,882
PROCESS FOR WELDING METALLIC SANDWICH STRUCTURE
Filed Nov. 15, 1955  2 Sheets-Sheet 2

*INVENTOR.*
*RAYMOND H. JOHNSON*
BY
*Knox & Knox*

United States Patent Office 2,820,882
Patented Jan. 21, 1958

2,820,882
PROCESS FOR WELDING METALLIC SANDWICH STRUCTURE

Raymond H. Johnson, Chula Vista, Calif.

Application November 15, 1955, Serial No. 546,997

4 Claims. (Cl. 219—117)

The present invention relates generally to welded metallic sandwich structures and more particularly to a process for the fabrication of metallic sandwich structures.

The primary object of this invention is to provide an improved and economical process for the fabrication of metallic sandwich structures, said structures comprising sheets or skins with core elements welded therebetween.

Another object of this invention is to provide a process wherein a multiple ram-mandrel electrode is used to position core elements between the skins.

Another object of this invention is to provide a process wherein substantial pressure is applied normal to the skins substantially simultaneously with the application of the welding current, thus insuring positive welding of all contacting surfaces.

Another object of this invention is to provide a process for the fabrication of metallic sandwich structures in which no burning or distortion of the welded material occurs.

Another object of this invention is to provide a process wherein the previously mentioned mandrel also acts as a thickness gauge, providing very accurate tolerance control.

Another object of this invention is to provide a process wherein the core elements of a metallic sandwich structure are interwelded.

Another object of this invention is to provide a process which is adapted for fabrication from many different materials, so that the choice of material can be according to the dictates of availability and price considerations, the exact sizes and proportions being matters easily determined to suit particular conditions and needs.

Another object of this invention is to provide a process which is practicable and inexpensive to manufacture.

Finally, it is an object to provide a process of the aforementioned character which is simple, safe and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
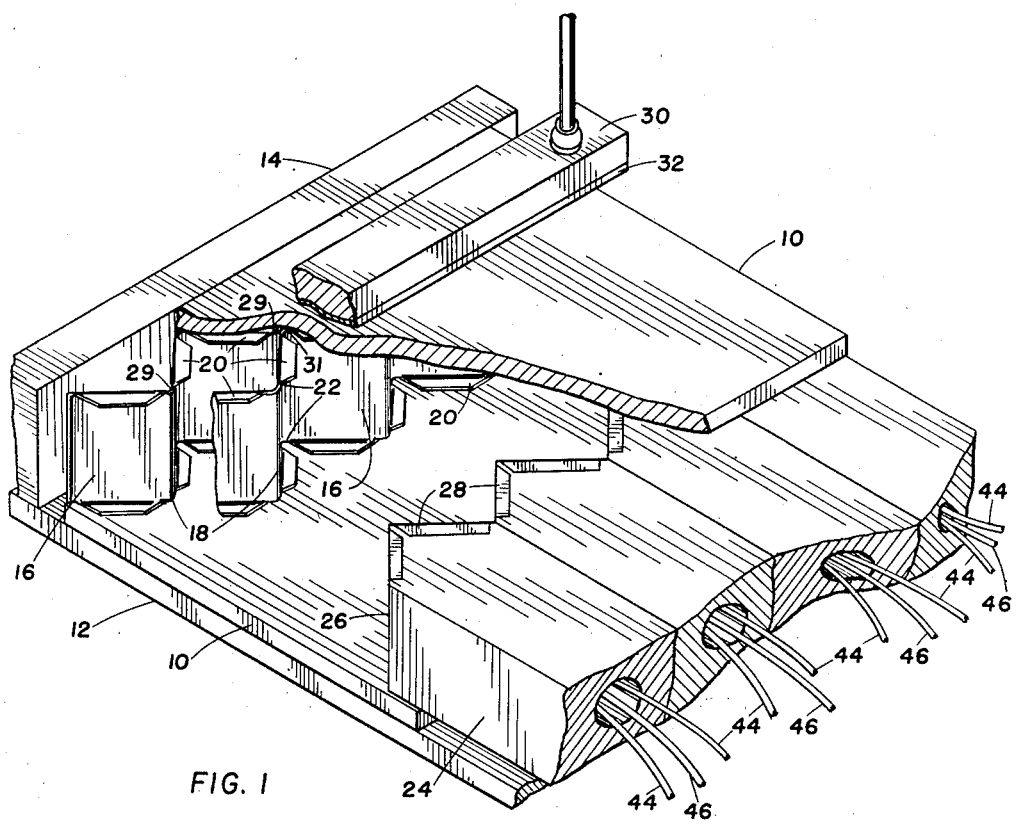
Figure 1 is a somewhat diagrammatic fragmentary representation of one possible arrangement of apparatus used to effect the positioning, welding and application of pressure in the instant process.

A great number of process and devices for the manufacturing or fabrication of metallic sandwich structures, sometimes designated as "hollow-core panels," have been brought forth. As is well known, this type of structure comprises two sheets of metal in spaced relation, and core strips of usually, but not necessarily, substantially the same composition as the sheets, inserted between the sheets and firmly attached by a welding process of some kind. The core strips may be of a greatly reduced thickness, as compared to the spaced sheets, and are usually convoluted or accordion folded to give the necessary stiffness characteristics.

This structure has been primarily developed by the aircraft industry, since the stress/weight factor is greatly increased as compared to solid panels of similar stress properties and, therefore, being admirably suitable for employment in stressed skin panels, bulkheads, and the like in aircraft. Although this structure is used extensively in the aircraft industry at the present time, the difficulties encountered in the manufacture thereof are many and varied and result in great expense to the industry. Incomplete welding of the contacting surfaces, distortion and burning of the skin sheets and the core strips, inaccessibility on curved panels, are but a few of the problems thus encountered.

The instant invention provides a means for dramatically resolving the problems encountered in the manufacture of metallic sandwich structures, thus reducing greatly the cost thereof.

Referring now to the drawings in detail, two metallic skin sheets 10 are placed in a jig 12 in parallel spaced relation, the spacing being slightly greater than the finished thickness of the structure. A backing strip 14 of preferably non-conductive material is an integral part of the jig 12, serving to position adjacent edges of the skin sheets 10, and also to position an initial core strip 16 therebetween.

The core strips 16 are formed of relatively thin slightly resilient metal strips and are provided with equally spaced reverse bends 18 along the length thereof, said bends providing great rigidity as is well known to the art. It will here be obvious that the strips 16 may be bent in many different patterns to accomplish the desired stiffening effect for a specific structure, the particular zig-zag pattern shown in Figure 1 being only for purposes of illustration.

Regardless of the nature of the convolutions or bending pattern, the strips 16 are provided with extended tabs or flange portions 20, continuous or disposed at spaced intervals along the longitudinal edges 22 thereof as shown, the tabs 20 being pre-formed and bent substantially normal to the strip for eventual disposition in parallel contacting relationship on the inner surface of the skin sheets 10.

The strips 16 are inserted by means of a plurality of ram members 24 insertable between the sheets 10. Each ram member 24 is provided with a tip 26 so shaped as to exactly conform to a portion of the convolution of the strip 16, and each ram member carries electrodes 28 recessed in the tip 26 to lie substantially flush with the surface thereof, and in such a position as to assure complete contact with the tabs or flanges 20.

The ram members 24 carry a strip 16 into contact with the previously inserted strip 16. To accomplish this the strips must be staggered so that the apices 29 and 31 are brought together and this is done by shifting the rams transversely with reference to the immediately preceding strip, between each succeeding stroke. The members 24 remain in contact with the tabs 20 while accurately controllable pressure is applied to the outer surfaces of the skin sheets 10 by a pressure bar 30.

An elongated electrode 32 is carried by the pressure bar, and is so proportioned as to contact the surface of the sheet 10 directly over the last strip 16 carried into position by the ram members 24. The jig 12 is so constructed and grounded or otherwise electrically connected as to act as another electrode directly opposed to the elongated electrode 32.

Figure 2:
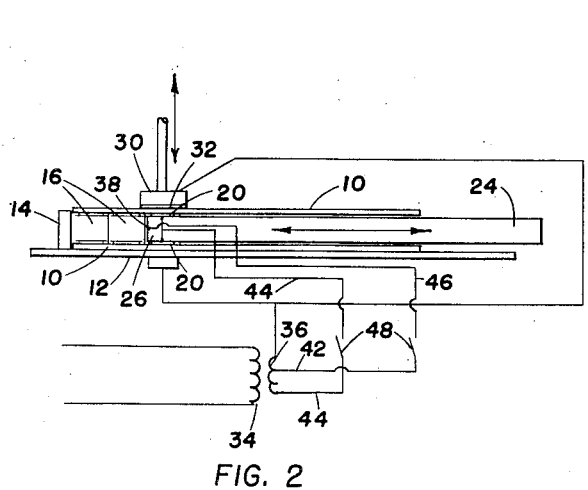
Figure 2 is a diagrammatic representation of the device of Figure 1 and including an electrical circuit therefor.
Figure 3:
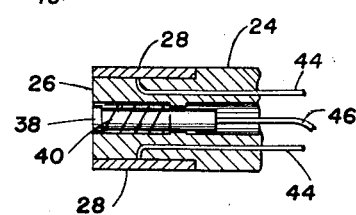
Figure 3 is a vertical sectional, fragmentary somewhat diagrammatic representation of the electrode-carrying ram.

As best shown in Figure 2, electrical current is provided by a conventional transformer 34, one terminal of the secondary coil 36 being connected with the electrodes 28 carried by the rams 24, the other terminal being connected with the elongated electrode 32 and the jig 12.

It may now be clearly understood that the tabs or flanges 20 are supported directly upon the electrodes 28, and a very firm contact is maintained between each tab 20 and the contact surface of the skin sheets 10, by the pressure bar 30. This pressure is maintained while the welding current is applied, assuring a very even weld between the tabs 20 and the sheets 10.

Very close tolerances are obtained in this manner, since the ram member tips are dimensioned to act as thickness gauge blocks, the external pressure slightly bending the tabs 20 when necessary and forcing the sheets toward each other as required to attain very close thickness tolerance control of the finished sandwich structure.

A still greater rigidity of the structure may be obtained by interwelding the core strips 16. This result may be obtained by the insertion of an electrode 38 in fixed relationship on the ram member or in axial sliding relationship with the ram member tip 26 with a spring 40 providing a predetermined bias of the electrode against one strip 16 at the point of contact with another preceding strip 16 in situ. The interwelding or "tack" welding current is applied slightly before the current is applied to the electrodes 28, so that there is no appreciable straying of current through the welded joints. The time interval between applications of current to the electrode 38 and the electrodes 28 may be obtained in a number of ways. I prefer simply the use of another tap of the transformer 42 supplying current to the electrode 38. Timing switches 48 may be interposed in the secondary circuits 44, 46, and actuated by the motion of the ram members 24 to control both the time interval between applications of current and duration of the currents.

It will now be clearly evident that substantially no distortion or burning of either the tabs 20 or the skin sheets 10 will occur, since the welding current is applied over the entire surface of each individual tab 20, the current passing through the tab 20 and the skin sheet 10, directly into the elongated electrode 32, the controlled pressure being reflected in controlled electrical resistance and uniform welding temperature.

Figure 4:
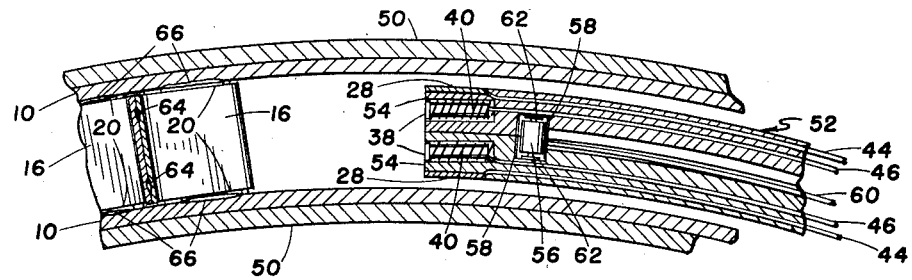
Figure 4 is a view similar to Figure 1 but illustrating a modified process wherein pressure is applied from within.
Figure 5:
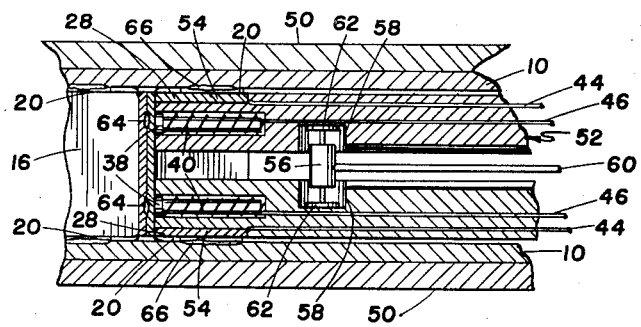
Figure 5 is an enlarged view of portions of the structure in Figure 4, the divided ram being shown in extended, pressure applying position.

Referring now to Figures 4 and 5, there is illustrated a modified process wherein a similar result is obtained by application of internal pressure, rather than the external pressure as hereinbefore disclosed, whereby curved panels and other irregularly shaped structures may be fabricated. The skin sheets 10 are inserted between fixed mold plates 50 and core strips of the necessary dimensions are preformed. The core strips 16 are consecutively carried into position between the skin sheets 10 by split ram members 52 in a manner similar to that previously disclosed herein. The ram members 52 are divided longitudinally and an electrode 38 is disposed in each of the halves 54 thus formed. A small hydraulic cylinder 56 is positioned in opposed sockets 58 in the halves 54, the sockets 58 being of a depth to allow the halves 54 to come into contact, and presenting a minimum thickness for insertion between the skin sheets 10, as clearly shown in Figure 4.

As best shown in Figure 5, a hydraulic fluid tube 60 provides fluid to the cylinder 56, extending the plungers 62 thereof, thereby forcing the halves 54 apart, and exerting the desired pressure against the flange portions 20 of the core strip 16.

The welding current is applied through the circuits 44, 46, which are in duplicate and completely analogous to the circuits previously described, thus accomplishing dual tack-welding of the core strips 16 as at 64, and welding of the flanged portions 20 to the skin sheets 10 as at 66.

It is noteworthy that in the first above described version of this process the ram member functioned as a thickness gauge for the fabricated panel while in the last mentioned version the fixed mold plates determine the final dimensions of the fabricated structure. However, the essential feature of this invention, in this regard, is the pressing of the flange portions and adjacent portions of the skin sheets together, during the welding thereof.

The instant invention may be considered a process involving the principal steps of bending the metal strips to provide the flanges 20, pushing the strips one at a time between the skin sheets 10 by means of the ram member 24 and with the electrodes 28 holding the flanges the required distance apart, and then pressing the sheets together against the flanges supported by the electrodes and energizing the electrodes, it being understood in this instance that the metal strips are preformed. Alternatively, and equally properly, the process disclosed herein may be thought of as including the preforming of the strips with bends 18 and with the strips being pushed into staggered relationship so that the bends of the succeeding zig-zag strips are in contact with each other, the forward edge of the ram member 24 being employed as a carrier for an electrode to tack weld the strips together, while the forward end of the ram member, as indicated at 28, also functions as an electrode in the welding of the flanges 20 to the skins. The process may also be properly considered as including the application of pressure from the inside rather than the outside, this variation being illustrated in Figures 5 and 6 wherein fixed mold plates hold the skins in their final position against pressure applied by a divided, combined electrode and ram member 52.

It will be obvious that all said objects are amply achieved by this invention and further description would appear to be unnecessary.

It is understood that minor variation from the invention disclosed herein may be made without departure from the spirit and scope of the invention, and that the specification and drawing are to be considered as merely illustrative rather than limiting.

I claim:

1. The process of fabricating a metal sandwich structure having skin sheets and a core of metal strips, said process comprising the following consecutive steps: (1) Bending portions on each longitudinal edge of a plurality of metal strips to constitute flange portions extending from one side of and substantially normal to adjacent portions of the strips; (2) Pushing the strips one at a time between a pair of metal sheets, by means of a member having its forward end engaged between the flange portions of the strips; (3) As each strip reaches its final position pressing the flange portions and the adjacent portions of the sheets together by relatively moving the sheets and the forward end of the member used to push the strips into place, with the sheets being held in the required final positions, and simultaneously passing welding current through the portions so pressed together.

2. A process according to claim 1 wherein the forward end of the member is employed as a welding electrode.

3. A process according to claim 1 and wherein the initial step includes bending the strips into undulating form, and the second step includes pushing the successive strips into staggered, inter-contacting relation.

4. A process according to claim 3 and including the step of tack welding each succeeding strip to the preceding strip by passing a welding current therethrough, this being accomplished by employing the leading edge of said member as a carrier of a welding electrode.

References Cited in the file of this patent

UNITED STATES PATENTS

| | | |
|---|---|---|
| 1,042,885 | Budd et al. | Oct. 29, 1912 |
| 2,419,149 | Lodwig | Apr. 15, 1947 |